(12) United States Patent
Scheuer

(10) Patent No.: US 9,740,525 B2
(45) Date of Patent: Aug. 22, 2017

(54) SCALING PRIORITY QUEUE FOR TASK SCHEDULING

(71) Applicant: SAP SE, Walldorf (DE)

(72) Inventor: Tobias Scheuer, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/945,262

(22) Filed: Nov. 18, 2015

(65) Prior Publication Data

US 2017/0139745 A1   May 18, 2017

(51) Int. Cl.
*G06F 9/48* (2006.01)

(52) U.S. Cl.
CPC .................. *G06F 9/4881* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 2003/0172104 A1* | 9/2003 | Hooman | G06F 9/4881 718/103 |
| 2014/0033212 A1* | 1/2014 | Balasubramaniam | G06F 9/5038 718/102 |
| 2016/0306657 A1* | 10/2016 | Stringer | G06F 9/4881 |
| 2016/0328265 A1* | 11/2016 | Xu | G06F 9/4881 |
| 2016/0328273 A1* | 11/2016 | Molka | G06F 9/4881 |

* cited by examiner

*Primary Examiner* — Charlie Sun
(74) *Attorney, Agent, or Firm* — Mintz Levin Cohn Ferris Glovsky and Popeo, P.C.

(57) ABSTRACT

In a computing system having a multiple central processing unit (CPU) cores the task scheduler can be configured to generate one or more priority value lists of elements, with each priority value list comprising elements having the same priority value. The priority queue of a task scheduler can be populated by links to priority value lists that are arranged in order of priority. Worker threads can access an input SIAO and determine the maximum priority of any element in the input SIAO. If the input SIAO has an element with higher priority than the priority queue of the task scheduler then the worker thread can cause the task associated with that element to be processed, otherwise the worker thread can cause all of the elements of the SIAO to be put into the priority value lists linked to by the elements in the priority queue.

14 Claims, 6 Drawing Sheets

SCALING PRIORITY QUEUE FOR TASK SCHEDULING

TECHNICAL FIELD

The subject matter described herein relates to scheduling tasks for execution by at least one central processing unit (CPU).

BACKGROUND

Tasks are performed by CPUs. CPUs can comprise of one or more computer cores. In some examples the CPU can have one can, four cores, eight cores, or more cores. The greater number of CPU cores, the greater number of tasks that can be processed in parallel.

The number of CPU cores available is finite. Consequently, tasks are scheduled by a CPU scheduler to prioritize those tasks having higher priority than other tasks.

Tasks or elements associated with tasks can be arranged in a priority list. Ideally tasks can be executed in order of priority. However, multiple threads, associated with multiple CPU cores, cannot access the priority queue at any one time. One of the threads must lock the others out to avoid errors in the processing of the tasks. This causes a bottleneck where a CPU core is waiting to process something, but the thread associated with the CPU core cannot access the element in the priority queue because a different thread has locked it.

SUMMARY

In one aspect, an apparatus for scheduling tasks to be performed by one or more processors is provided. The apparatus can be configured to perform one or more operations. The operations can include activating, by the apparatus, a worker thread. The worker thread can be configured to get elements from an inbound job. The inbound job can include one or more elements. Individual elements of the inbound job can have a priority value. The apparatus can compare the priority values of the elements in the inbound job with the priority values of elements in a priority queue of a task scheduler. In response to determining that at least one task of the inbound job has a higher priority value of than any of the elements in the priority queue, the apparatus can cause the element from the inbound job to be processed.

In some variations, the apparatus can be a process scheduler of a computing system. The apparatus can include at least one central processing unit having at least one core. The at least one core can be configured to process tasks in accordance with the worker thread activated by the process scheduler.

In response to determining that none of the elements in the inbound job have a priority value higher than the element in the priority queue with the highest priority value, the apparatus can insert the elements of the inbound job into the priority queue. The apparatus can normalize the priority queue. The apparatus can cause the task associated with the highest priority value in the priority queue to be processed.

Normalizing the priority queue can include generating one or more priority value lists of elements comprising elements from the priority queue that have the same priority value.

Elements that have the same priority value can have a priority value within a given range.

The apparatus can be configured to generate headers to the priority value lists for inclusion in the priority queue. The headers can link to individual ones of the priority value lists.

Normalizing the priority queue can include arranging the headers to the priority value lists in the priority queue by order of priority value.

The apparatus can be configured to generate the inbound job. The inbound job can include one or more elements. The one or more elements can be associated with a task for processing by a central processing unit. Getting elements from an inbound job can include attempting to acquire a lock on the inbound job. The priority value of an element can be generated based on a timestamp of the element.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Variations of the present disclosure include systems, methods, and computer implemented instructions, for increasing the efficiency of a task scheduler in highly concurrent analytical and transactional applications and systems. Task schedulers can include priority queues of elements arranged in order of priority. Elements in the priority queues can have an associated priority. Threads, associated with central processing unit (CPU) cores can access a priority queue. Threads can access the priority queue to add elements or "get" elements. Getting elements from the priority queue can cause the CPU core associated with the thread that is getting the elements to execute the task associated with the element having the highest priority value in the priority queue. This is known as a thread "popping the top" of the priority queue. Generally, all threads are able to add elements to the priority queue. A subset of threads, known as worker threads, are capable of popping the top of the priority queue.

As described further herein, it is necessary to lock a priority queue from access by all other threads when a thread is either adding or getting an element from it. When this lock occurs all the other threads have to wait their turn, causing a lock contention and thereby slowing the processing capabilities of the CPUs in the computing system. Ways to overcome this lock contention introduce looseness into the priority queue. Some elements having a lower priority than others work their way to the top of the priority queue. When a thread pops of the top of the priority queue, a task that is not a task having the highest priority can be processed. This can cause problems with task execution, especially in applications where the execution of the highest priority task is important.

The presently described subject matter provides a way to avoid lower priority elements working their way to the top of a priority queue and getting processed prematurely, thereby allowing reduction in lock contention as well as ensuring that the highest priority task is processed first. The presently described subject matter provides for normalization of the elements in the priority queue. The normalization of the elements in the priority queue can create priority value lists being lists of elements of the same priority value. The priority queue can be configured to include a list of elements that are headers for individual priority value lists.

Threads attempting to pop the top of the priority queue will first encounter the header linking to the priority value list that has the highest priority value causing the thread to process get the elements having the highest priority first. This avoids the case where a lower priority task is processed prior to a higher priority task, which can cause problems for the processing of applications, and the like.

Figure 1:
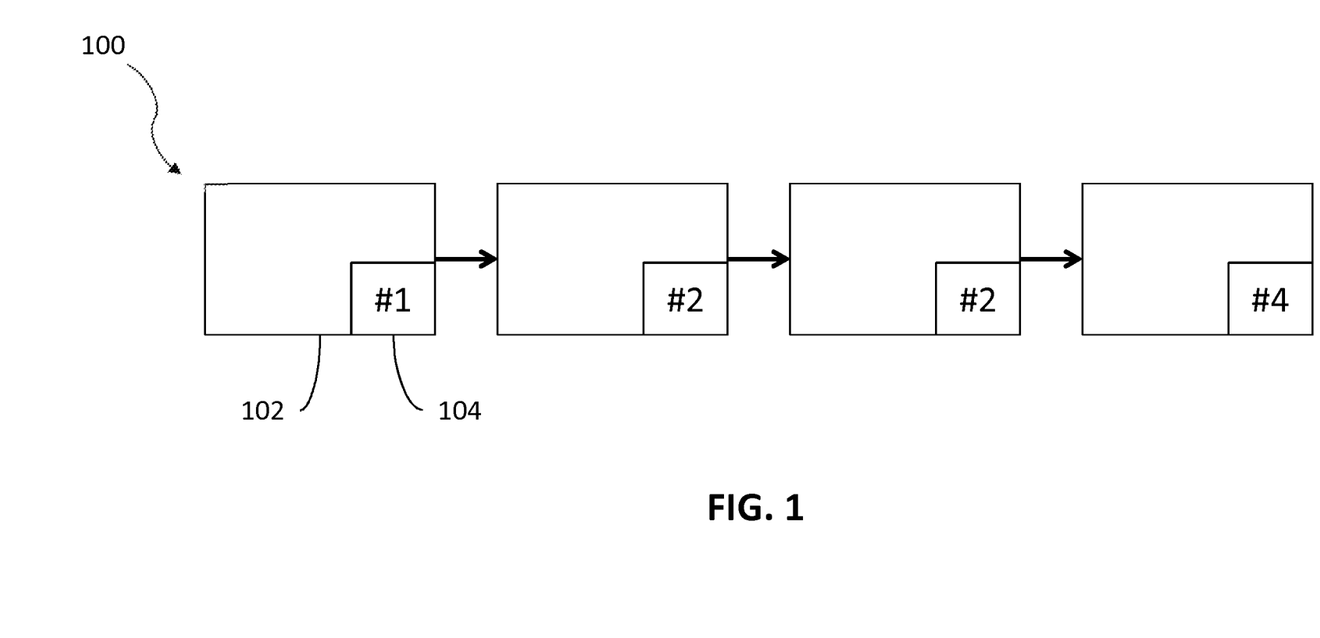
FIG. 1 is an illustration of a priority queue having elements with an associated priority value according to one or more elements consistent the present description.

FIG. 1 is an illustration of a priority queue 100 having elements 102 with an associated priority value 104. The elements 102 of the priority queue 100 can be arranged in order of priority. The elements 102 of the priority queue 100 can form a linked list. The elements 102 can be links to tasks to be performed by one or more processors. In some applications, the priority queue needs to be accessed by multiple threads in parallel. This is especially true in multi-core computer systems. Multi-core computer systems include computer system that have multiple central processing units (CPUs) and systems that include one or more CPUs that have multiple processing cores. In some applications, each core can be associated with a thread.

Figure 2:
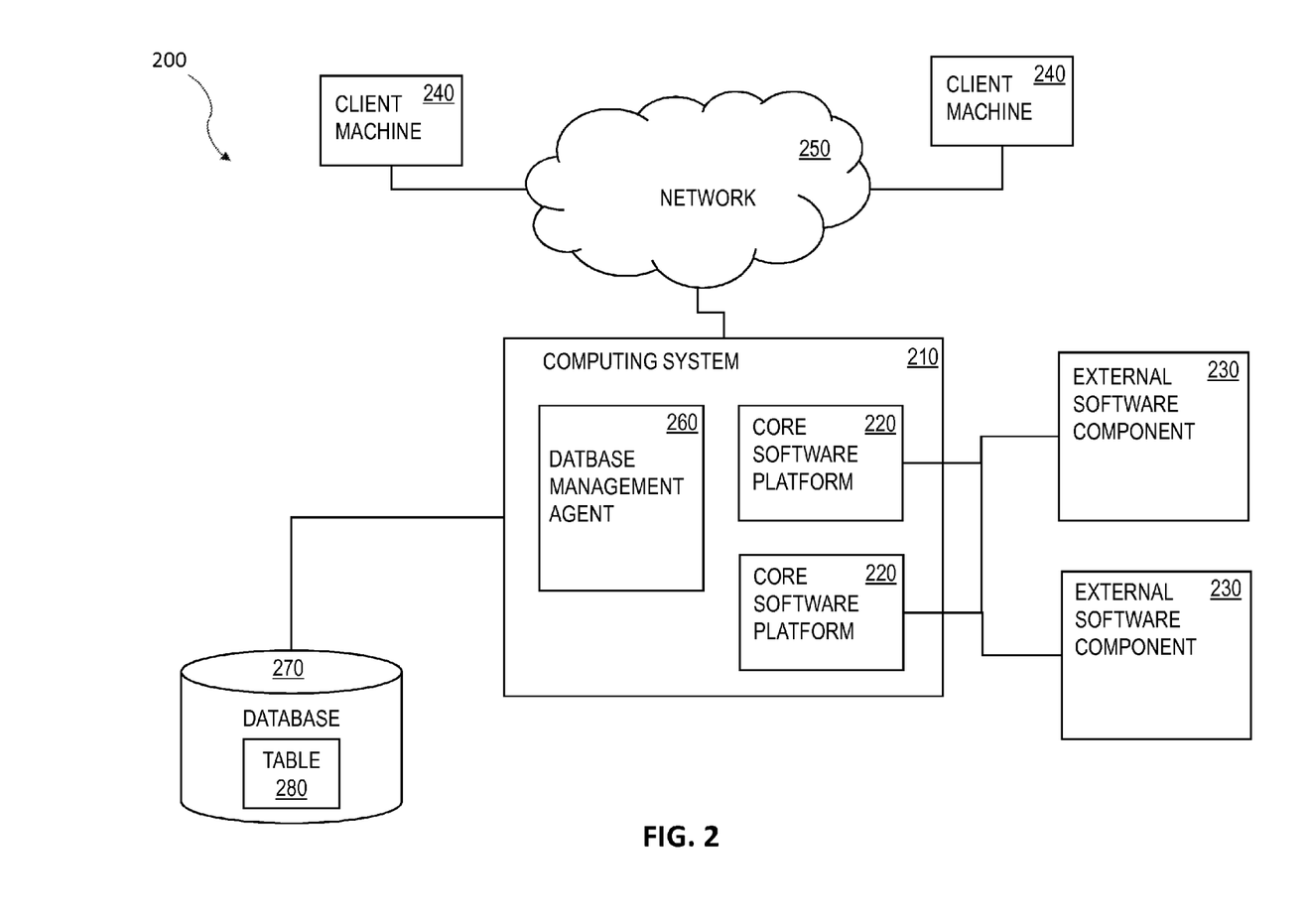
FIG. 2 is a diagram of a system having one or more elements consistent with the present description.

FIG. 2 shows a diagram 200 of a system having one or more elements consistent with the present description. The system can include a computer system 210 configured to provide applications. For example, the computer system 210 can facilitate the operation of application configured to facilitate and/or interact with a database management system. The computing system 210 can include one or more core software platform modules 220 providing one or more features of the software system. The computing system can also aggregate or otherwise provide a gateway via which users can access functionality provided by one or more external software components 230. Client machines 240 can access the computing system, either via a direct connection, a local terminal, or over a network 250 (e.g. a local area network, a wide area network, a wireless network, the Internet, or the like).

A data management agent 260 or other comparable functionality can access a database management system 270 that stores and provides access to data (e.g. definitions of scenarios, processes, and one or more configurations as well as data, metadata, master data, etc. relating to definitions of the scenarios, processes, and one or more configurations, and/or concrete instances of data objects and/or objects that are relevant to a specific instance of a scenario or a process, and the like. The database management system 270 can include at least one table 280 and additionally include parallelization features consistent with those described herein.

Figure 3A:
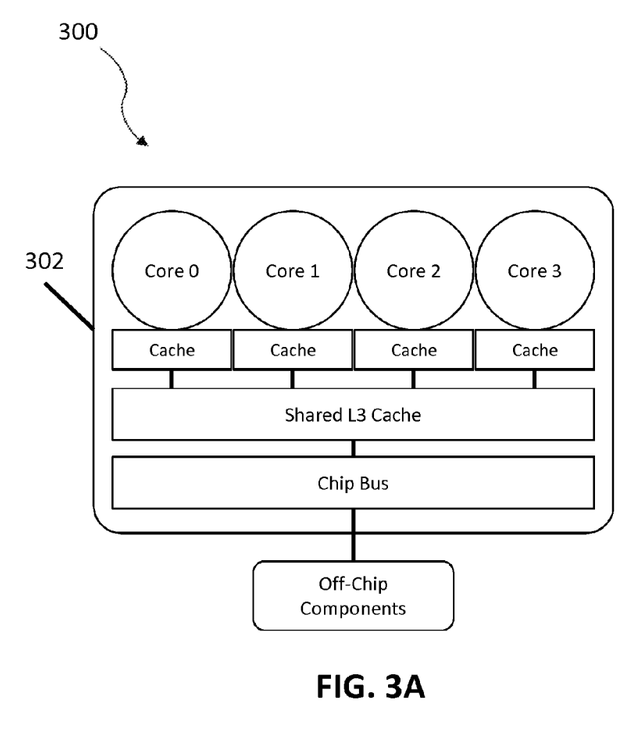
FIG. 3A is a diagram of a multi-core CPU having one or more elements consistent with the present description.
Figure 3B:
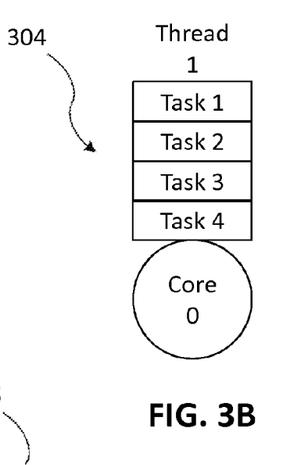
FIG. 3B is a diagram of a thread comprising a series of tasks being processed by a single core of a CPU having one or more elements consistent with the present description.
Figure 3C:
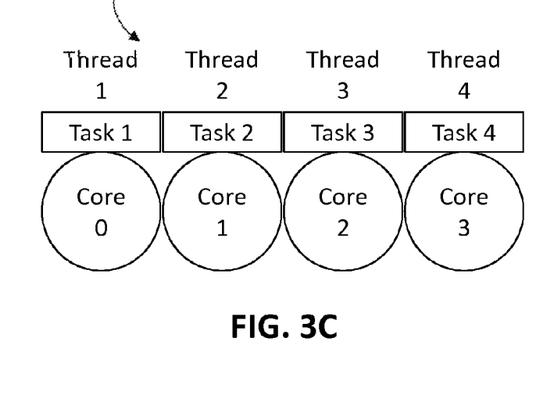
FIG. 3C is a diagram of multiple threads comprising tasks being processed by multiple cores of a CPU having one or more elements consistent with the present description.

The various components of the system illustrated in diagram 200 can require tasks to be performed by the CPU cores of the computing system 210. FIG. 3A is a diagram 300 of a multi-core CPU 302. The cores of the CPU 302 can perform threads of tasks. FIG. 3B illustrates a diagram 304 of a thread comprising a series of tasks being processed by a single core. FIG. 3C illustrates a diagram 306 of the tasks illustrated in FIG. 3B being processed in parallel by individual cores of a multi-core CPU. Processing tasks in parallel by the cores of a multi-core CPU decreases the time required to process all of the tasks. Parallel processing in this manner requires the tasks illustrated FIG. 3B as being part of a single thread to be separated into multiple threads as illustrated in FIG. 3C. Multiple threads need to access the priority queue in order to achieve processing of the tasks in parallel. Where applications require tasks to be strictly performed in order of priority it is necessary to ensure that the priority queue is properly arranged in strict order of priority.

In some variations, the presently described task scheduler can be integrated into an existing task scheduler of the computing system 210 or into an application, such in the core software platform 220, the external software component 230, the database management agent 260, and the like. Variations of the task scheduler may be implemented in new and existing database management systems. The presently described task scheduler implemented in a database management system can avoid over commitment and/or under-utilization of computing resources by increasing the efficiency at which active worker threads access the priority queue.

Typically all threads can insert new elements into the priority queue. A subset of threads, called worker threads, can get elements from the queue, causing the processors to process the tasks associated with those elements. When the elements have associated priority information, the elements in the priority queue can be arranged in order of priority value, causing the top-most element in the priority queue to have the highest priority value. Worker threads access the top-most element in a priority queue for processing. This is known as popping the top of the priority queue. When the priority queue is properly arranged, worker threads should be processing the task associated with the element with the highest priority prior to any other tasks.

Threads that attempt to access the priority queue need to be synchronized with all other threads that are attempting to access the priority queue. This is true for threads that are attempting to insert elements into the priority queue as well as threads attempting to get elements from the priority queue. The priority queue needs to be locked for a number of reasons including stopping multiple threads from popping the top of the priority queue and thereby processing the same task.

Synchronization can be performed by a mutex, which can facilitate the mutual exclusion of all other threads from the resource while it is being accessed by a thread. A mutex can be configured to facilitate multiple program threads in the sharing of the same resource, such as the priority queue, but also avoid simultaneous access to the resource by more than one thread. When a thread wishes to access the priority queue it must first lock the mutex from all other threads, prohibiting access to the resource by the other threads. The mutex will unlock subsequent to the thread finishing with the resource, or after completion of a routine.

Some computing systems can have hundreds of CPU cores and hundreds of threads. When hundreds of threads are attempting to access the same resource, the synchronization of the threads can create a large lock contention. A lock contention occurs whenever one thread attempts to acquire a lock held by another thread. This causes all other threads to have to wait until their turn to access, and then lock, the thread.

Overcoming the locking contention can introduce inefficiencies of their own into the processing of the tasks. For example, mutexes may be provided that are more fine-grained. For example, in a database management system, a mutex may be provided to lock individual rows, instead of whole tables, or locking a cell, instead of a whole row. While this may decrease lock contention it does so at the expense of increasing lock overhead. Having multiple mutexes for fine-grained locking of resources can introduce lock dependencies. Some of these lock dependencies can be subtle leading to the undesirable result of accidently introducing a deadlock situation.

Ways of reducing the lock contention can introduce looseness into which element from the priority queue is processed first. After application of some anti-lock applications, some worker threads do not get the top element in the priority queue and instead get an element having a lower priority value. Tasks associated with elements having a priority value less than the element having the highest priority value can be processed first, causing the most urgent tasks to be delayed in their processes. Where exactness in processing the highest priority task first is required, methods of overcoming the lock contention that introduce such a looseness cannot be applied.

Reducing the lock contention can be done when there are more threads attempting to insert elements into a priority queue than there are worker threads attempting to get elements from the priority queue. Instead of allowing the threads to insert a new element into the priority queue, a plurality of new elements can be collected in a single-in all-out (SIAO) list. Worker threads that obtain the lock on the priority queue can be configured to introduce the new elements into the priority queue when "getting" the top element from the priority queue. When there are many threads attempting to get elements from the top of the priority queue, the use of the SIAO list can still result in a lock contention.

Figure 4:
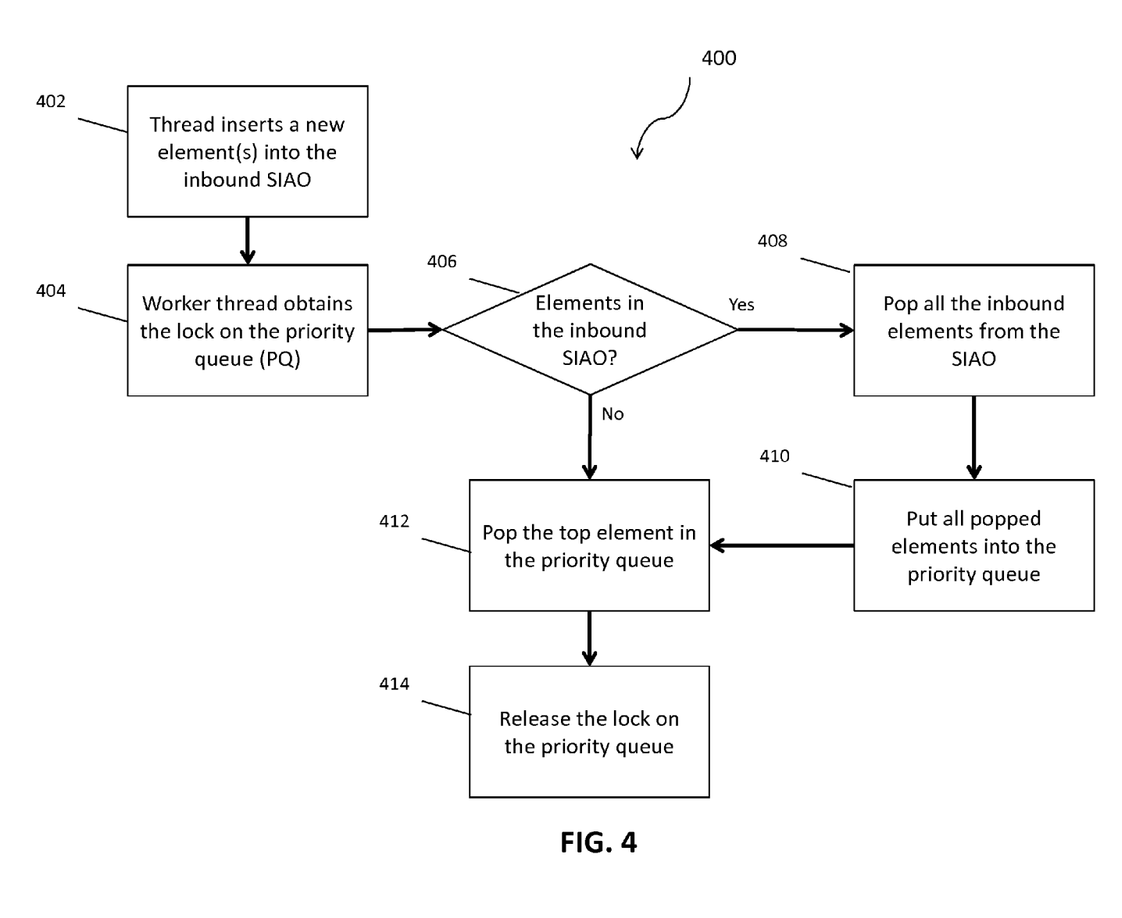
FIG. 4 is an illustration of an example of a process by which threads insert elements into a priority queue and get elements from a priority queue, having features consistent with the current description.

FIG. 4 is an illustration of an example of a process 400 by which threads insert elements into a priority queue and get elements from a priority queue, having features consistent with the current description. At 402, threads insert new element(s) into the inbound SIAO. All threads that are not worker threads can be barred from accessing the priority queue directly. An SIAO list facilitates the popping of all elements in the SIAO list. This means that all elements that have been put into the SIAO list can be moved from the SIAO list to the priority queue by a single thread. At 404, a worker thread obtains the lock on the priority queue. At 406, a determination is made as to whether there are any elements in the SIAO list.

At 408, in response to a determination that there are elements in the SIAO list, the worker thread pops all of the elements of the SIAO list. At 410, the worker thread puts all of the popped elements from the SIAO list into the priority queue. The priority queue can be arranged by order of priority.

At 412, in response to a determination that there are no elements in the SIAO or in response to all of the elements popped from the SIAO being introduced into the priority queue, the worker thread can pop the top element of the priority queue. The CPU core associated with the thread can process the task associated with the top element. At 414, the worker thread can release the lock on the priority queue.

In some situations, many elements in the priority queue can have the same priority value. In some applications, elements can have both a priority value and a timestamp associated with the element. In some variations, the priority value as used in the priority queue can be formed from both a priority of the element as well as the timestamp associated with the element. Mixing the timestamp of an element into the priority value has the benefit of providing an ageing mechanism into the priority queue. The priority value can be dynamic and allow elements to move up in priority as they age. Consequently, older elements tend to move toward the top of the queue because the newer elements have smaller priority values. This avoids starvation where a task associated with a lower priority element never gets performed.

Figure 5A:
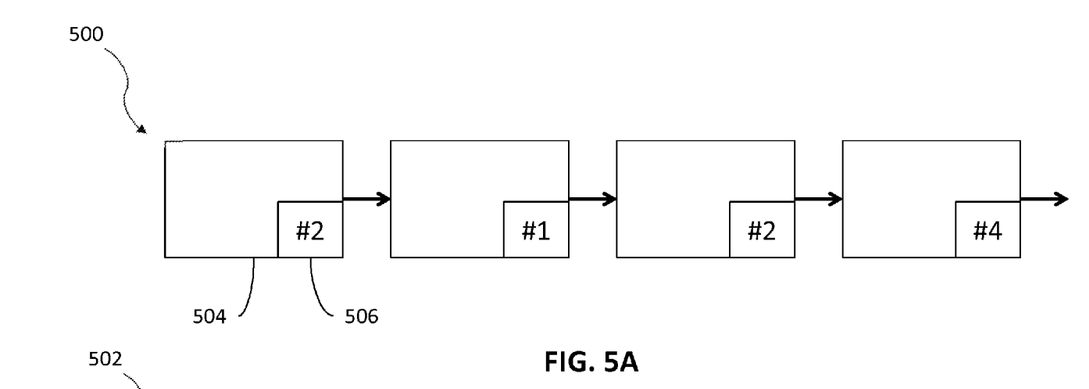
FIG. 5A is a diagram showing a priority queue having had one or more anti-lock contentions method applied to it consistent with one or more elements of the present description.
Figure 5B:
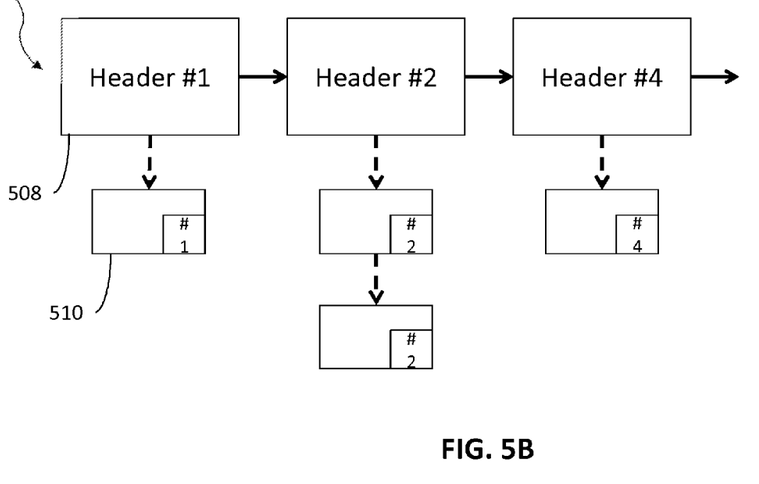
FIG. 5B is a diagram showing a priority queue after normalization in accordance with one or more elements consistent with the present description; and, FIG. 6 is an illustration of an example of a process having one or more elements consistent with the present description.

FIGS. 5A and 5B are diagrams and showing a priority queue 500 and 502 before and after normalization, respectively, in accordance with one or more elements of the present description. FIG. 5A is a diagram showing a priority queue 500 having had one or more anti-lock contention methods applied to it. Consequently, the priority queue 500 does not have elements 504 arranged in perfect order of priority. The top of the priority queue 500 has a priority value 506 lower than the priority value of the second element in the priority queue.

The task scheduler can be configured to assign the elements to a priority value list. The elements having a particular priority value are assigned to that priority value list. FIG. 5B is a diagram showing a priority queue 502 after normalization. The priority queue 502 comprises elements 508 that are links, or headers, to the priority value list 510 of a particular priority value. As illustrated in FIG. 5B, the first element of the priority queue 502 is a header for the priority value list having priority value #1. The second element of the priority queue 502 is a header for the priority value list having priority value #2. Consequently, the priority queue 502 only contains elements having different priority values. If an element is introduced into the priority queue 502 that matches the priority value of any other element it can be put into the priority value list associated with that priority value.

When a worker thread accesses the priority queue it can pop the top of the priority queue. After normalization, doing so will cause all of the elements in the priority value list associated with the top element of the priority queue to be accessed for processing. This can create a simple queue of element with all the same priority value. The simple queue can be stored in the cache of one or more of the CPU cores for processing.

Figure 6:
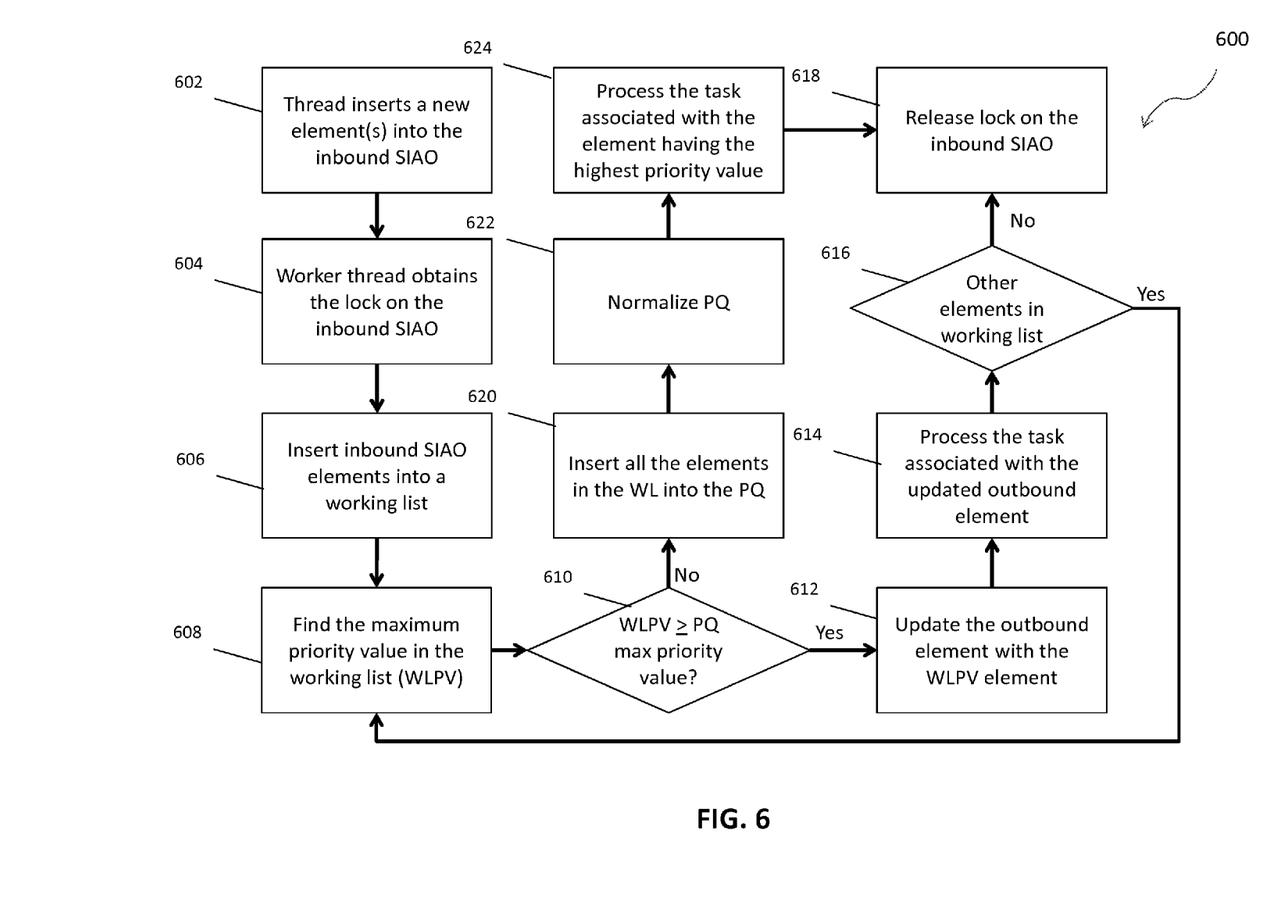

FIG. 6 is an illustration of an example of a process 600 by which threads insert elements into a priority queue and get elements from a priority queue after normalization in accordance with one or more elements of the current description. At 602 one or more threads can insert a new element(s) into the inbound SIAO. In some variations, the process of inserting a new element(s) into the inbound SIAO at 602 can be similar to the process of inserting a new element(s) into the inbound SIAO at 402 in FIG. 4.

At 604, a worker thread can attempt to secure a lock on the priority queue. The worker thread can attempt to secure a lock on the priority queue by looping a locking algorithm a number of times until the thread's attempt to lock the priority queue is accepted. The algorithm controlling which threads can obtain the lock on the priority queue can be based on the order of priority for particular thread tasks. For example, one worker thread may be required to process the element having the highest priority value due to a thread associated with a CPU core of the same CPU previously or simultaneously processing a task associated with a previous element.

At 606, the worker thread can be configured to insert all of the elements in the inbound SIAO into a working list. In some variations, the working list can be separate from the priority queue. In other variations, the working list can be the priority queue.

At 608, the working thread can be configured to find the maximum priority value in the working list.

At 610, where the working list and the priority queue are separate lists, a determination can be made as to whether the highest priority value in the working list is greater than the highest priority value in the priority queue.

At 612, in response to determining that the working list contains an element with a higher priority value than the priority queue, the outbound element can be updated with the element in the working list having the higher priority value.

At 614, the task associated with the element in the updated outbound can be processed. In this manner, the priority queue can be by-passed without the working thread having to wait to obtain the lock on the priority queue. The highest priority task can be processed first without waiting for the delay that comes with obtaining the lock on the priority queue and normalizing the priority queue.

At 616, a determination can be made as to whether there are any other elements in the working list.

At 618, in response to determining that there are no more elements in the working list, the working thread can release the lock on the inbound SIAO having processed the highest priority task without having to obtain a lock on the priority queue.

In response to determining that there are more elements in the working list, the working thread can then repeat the operations at 608, namely, finding the new maximum priority value in the working list.

At 620, in response to determining, at 610, that the maximum priority value in the working list is less than the maximum priority value in the priority queue, the working thread can be configured to obtain a lock on the priority queue and insert all of the elements in the working list into the priority queue. In some variations, the working thread can release the lock on the inbound SIAO in response to inserted all the elements of the inbound SIAO into the priority queue.

At 622, the elements of the priority can be normalized in response to the influx of new elements. In some variations, the normalization of the elements in the priority queue can be performed in accordance with the description of FIGS. 5A and 5B.

At 624, in response to the normalization of the priority queue, the working thread can pop the top of the priority queue. The working thread can process the task associated with the element having the highest priority value in the normalized priority queue.

In response to processing a task at 624, the working thread can release the lock on the inbound SIAO and the priority queue.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The current subject matter includes a number of aspects that can be applied individually or in combinations of one or more such aspects. An example of an implementation of the current subject matter includes supporting a unified database table approach that provides performance advantages to in-memory database approaches with reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; systems using on-disk OLAP (e.g. "big data," analytics servers for advanced analytics, data warehousing, =intelligence environments, or the like), for example databases sized at several petabytes or even more, tables with up to trillions of rows, and the like.

The current subject matter can be implemented as core software platform of an enterprise resource planning (ERP) system, other software architecture, or other data-intensive computing application or software architecture that runs on one or more processors that are under the control of a specific organization. This arrangement can be very effective for large-scale organizations that typically spend large resources on software, hardware and consulting services in implementing and adapting software solutions.

Without in any way limiting the scope, interpretation, or application of the claims appearing herein, a technical effect of one or more of the example embodiments disclosed herein may include increasing throughput of threads, maintaining power consumption (and as a result cooling demand) of a CPU below a certain threshold (which is according to the sizing of the power unit and cooling capacity of the computer system). Without in any way limiting the scope, interpretation, or application of the claims appearing herein, a technical effect of one or more of the example embodiments disclosed herein may include reducing the runtime of a series of tasks independently of the design of the task through the increased efficiency of accessing the priority queue of a task scheduler, by reducing lock contention on the priority queue, while decreasing the looseness that can be introduced by lock contention reducing algorithm These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed is:

1. An apparatus comprising:
one or more processors: and
one or more memory including code which when executed by the one or more processors cause the apparatus
to at least:
activate a worker thread configured to get one or more inbound elements from an inbound job, the one or more inbound elements having one or more inbound job priority values, one inbound element of the one or more inbound elements having a highest inbound job priority value;
compare the one or more inbound job priority values with one or more priority queue priority values associated with one or more priority queue elements, the one or more priority queue elements forming a priority queue, one priority queue element of the one or more priority queue elements having a highest priority queue value;
insert, in response to determining that the highest inbound job priority value is less than the highest priority queue value, the one or more inbound elements into the priority queue;
normalize the priority queue by at least generating one or more priority value lists, the one or more priority value lists comprising one or more priority queue elements with a same priority queue priority value;
generate one or more headers to the one or more priority value lists, the one or more headers being included in the priority queue, the one or more headers linking to the one or more priority value lists; and
cause a task, associated with the priority queue element having the highest priority queue value, to be processed.

2. The apparatus of claim 1, wherein the one or more processors comprise:
at least one central processing unit having at least one core, the at least one core configured to process tasks in accordance with the worker thread activated by a process scheduler.

3. The apparatus of claim 1, wherein the one or more priority value lists comprise the one or more priority queue elements with a priority queue priority value being within a range of priority queue values.

4. The apparatus of claim 1, wherein the normalizing of the priority queue further comprises:
arranging the one or more headers in the priority queue by order of priority queue priority values associated with the one or more priority value lists.

5. The apparatus of claim 1, further configured to at least:
generate the inbound job, the one or more inbound elements being associated with the task for processing.

6. The apparatus of claim 1, further configured to at least:
get the one or more inbound elements from the inbound job by at least attempting to acquire a lock on the inbound job.

7. The apparatus of claim 1, wherein the one or more inbound job priority values of the one or more inbound elements are generated based on a timestamp of the one or more inbound elements.

8. A method to be performed by one or more processors forming at least a part of a computing system, the method comprising:

activating a worker thread configured to get one or more inbound elements from an inbound job, the one or more inbound elements having one or more inbound job priority values, one inbound element of the one or more inbound elements having a highest inbound job priority value;

comparing the one or more inbound job priority values of the one or more inbound elements with one or more priority queue priority values associated with one or more priority queue elements forming a priority queue one priority queue element of the one or more priority queue elements having a highest priority queue value;

inserting, in response to determining that the highest inbound job priority value is less than the highest priority queue value, the one or more inbound elements into the priority queue;

normalizing the priority queue by at least generating one or more priority value lists, the one or more priority value lists comprising one or more priority queue elements with a same priority queue priority value;

generating one or more headers to the one or more priority value lists, the one or more headers being included in the priority queue, the one or more headers linking to the one or more priority value lists; and causing a task, associated with the priority queue element having the highest priority queue value, to be processed.

9. The method of claim 8, wherein the one or more processors have at least one core, the at least one core configured to process tasks in accordance with the worker thread activated by a process scheduler.

10. The method of claim 8, wherein the one or more priority value lists comprise the one or more priority queue elements with a priority queue priority being within a range of priority queue priority values.

11. The method of claim 8, wherein the normalizing of the priority queue further comprises:
arranging the one or more headers in the priority queue by order of priority queue priority values associated with the one or more priority value lists.

12. The method of claim 8, further comprising:
generating the inbound job, the one or more elements of the inbound job being associated with the task for processing by a central processing unit.

13. The method of claim 8, further comprising:
getting the one or more elements from the inbound job by at least attempting to acquire a lock on the inbound job.

14. The method of claim 8, wherein the one or more inbound job priority values of the one or more inbound elements from the inbound job are generated based on a timestamp of the one or more inbound elements.

\* \* \* \* \*